Oct. 20, 1936.  E. E. COLLISON ET AL  2,057,880
VENDING MACHINE
Filed May 1, 1935   5 Sheets-Sheet 1
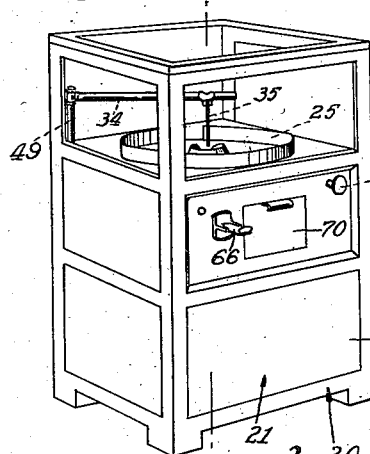
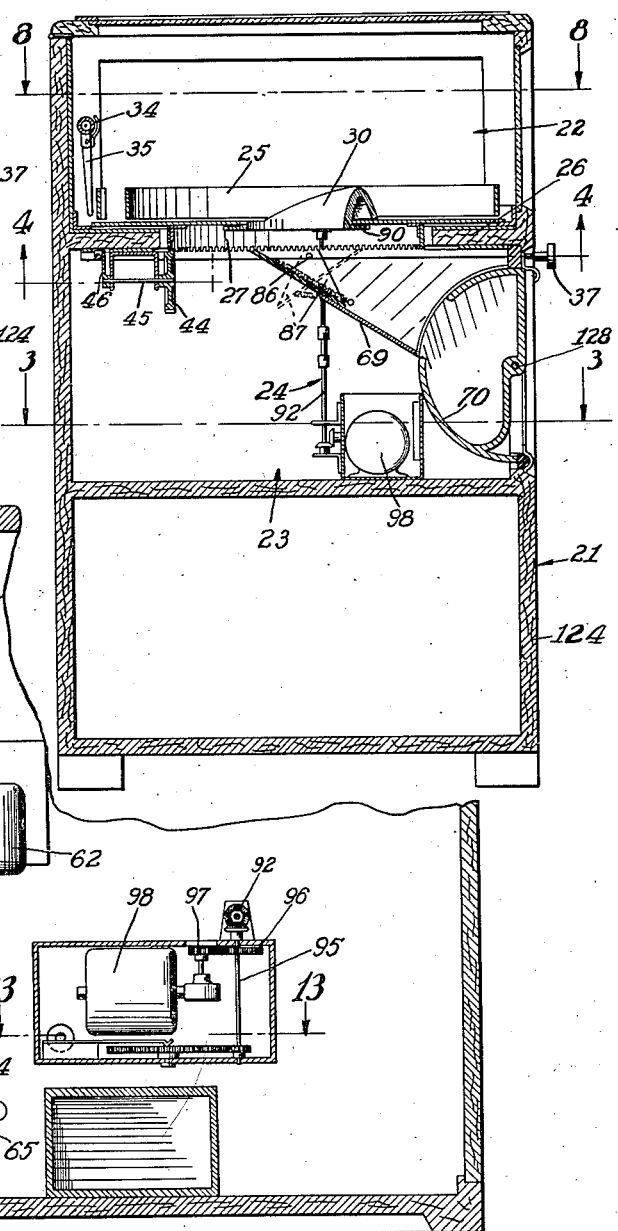
INVENTORS.
Claude R. Kirk
Edward E. Collison
BY Threedy and Cannon
THEIR ATTORNEYS.

Oct. 20, 1936. E. E. COLLISON ET AL 2,057,880
VENDING MACHINE
Filed May 1, 1935  5 Sheets—Sheet 2
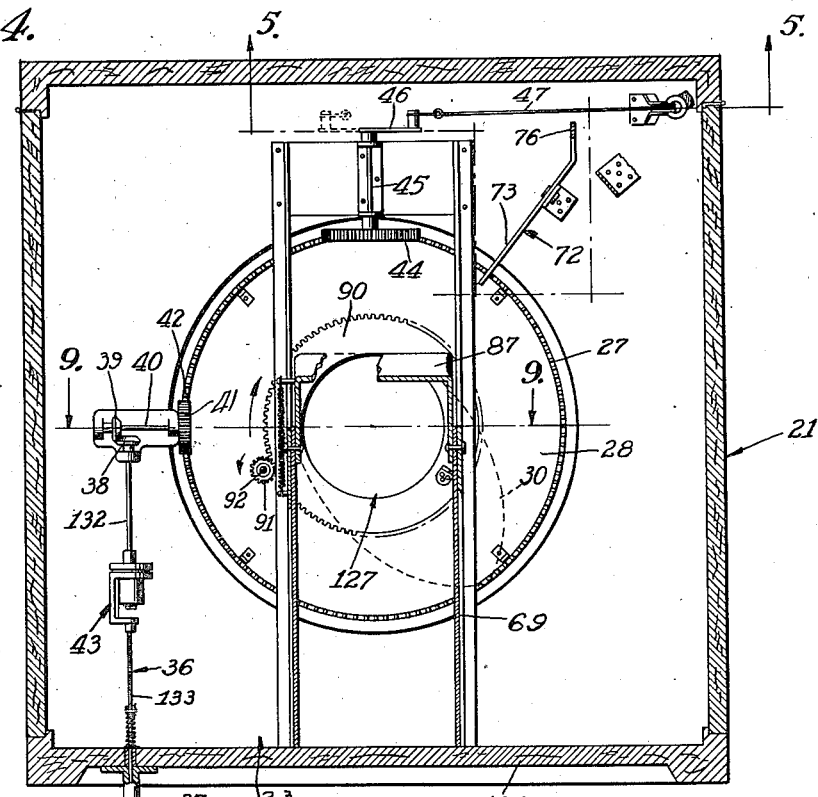
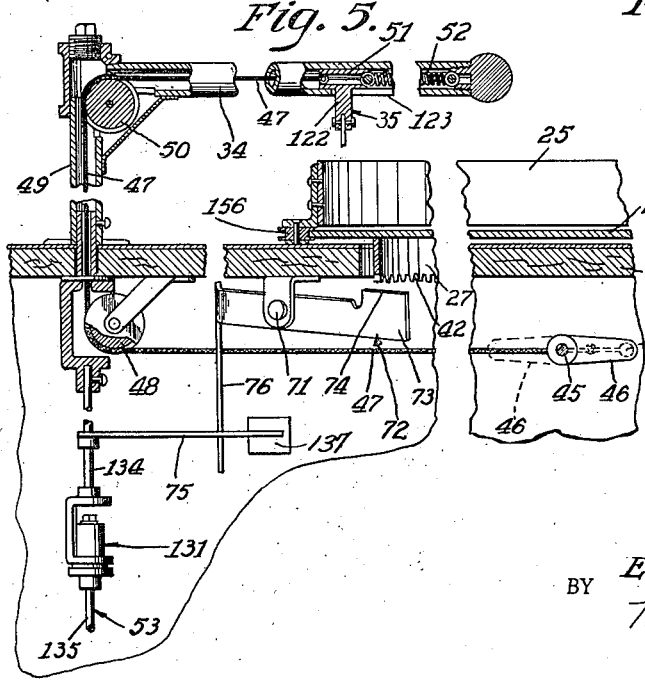
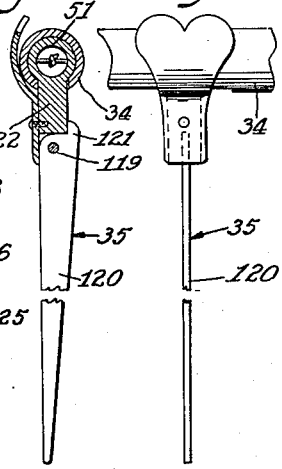
INVENTORS.
Claude R. Kirk
Edward E. Collison
BY
Thrudy and Cannon
THEIR ATTORNEYS.

Oct. 20, 1936.   E. E. COLLISON ET AL   2,057,880
VENDING MACHINE
Filed May 1, 1935   5 Sheets-Sheet 3
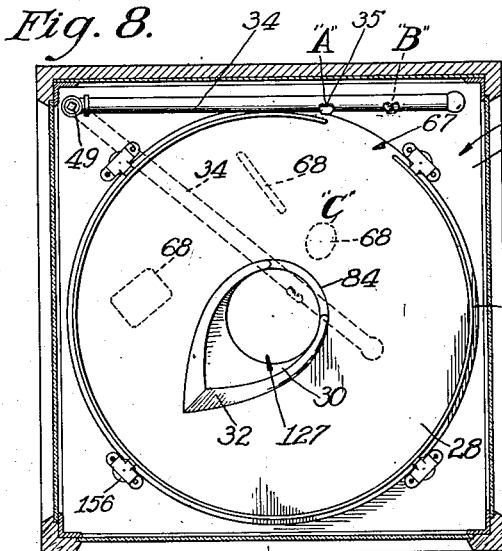
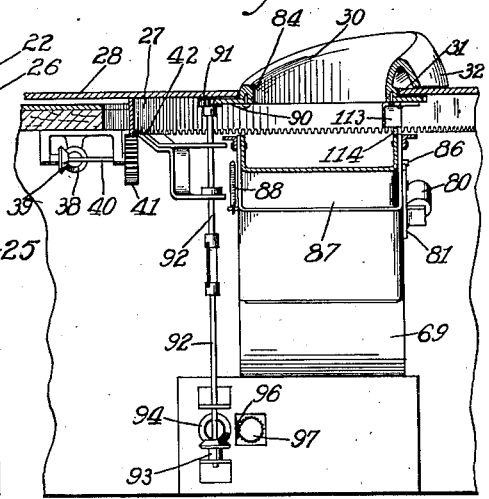
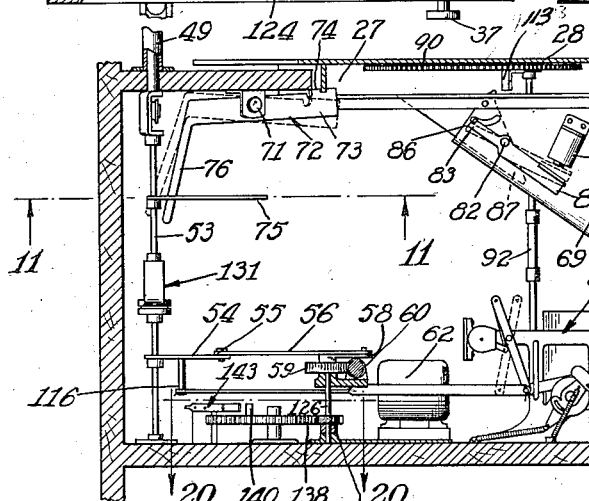
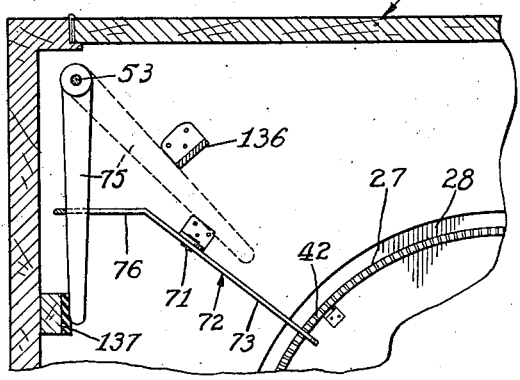
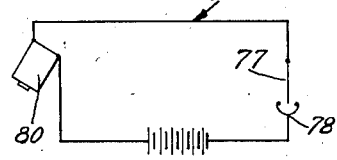
INVENTORS
Claude R. Kirk
Edward E. Collison
BY Threedy and Cannon
THEIR ATTORNEYS.

Oct. 20, 1936.  E. E. COLLISON ET AL  2,057,880
VENDING MACHINE
Filed May 1, 1935   5 Sheets-Sheet 4
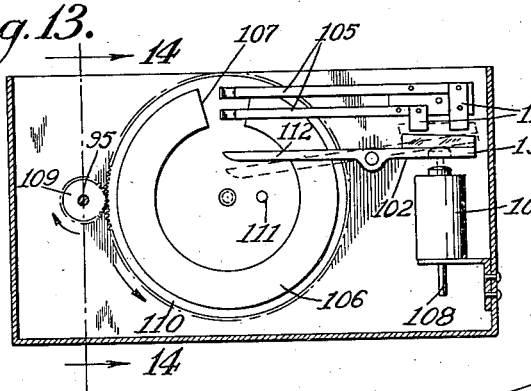
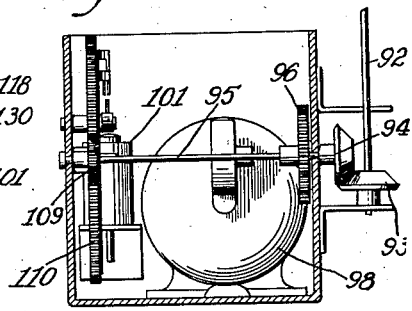
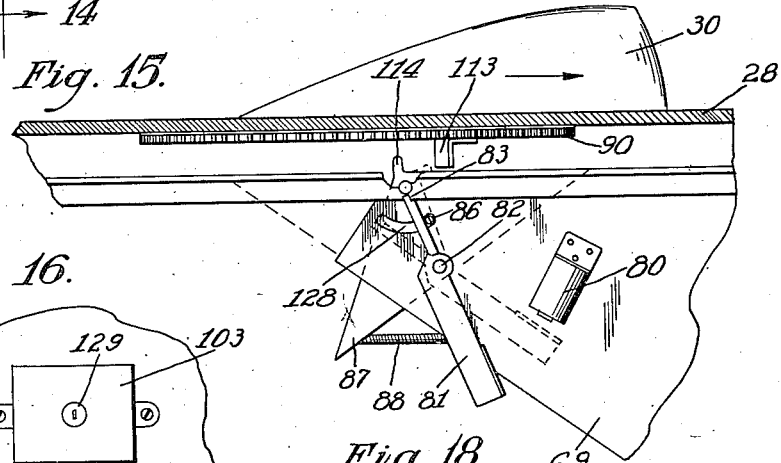
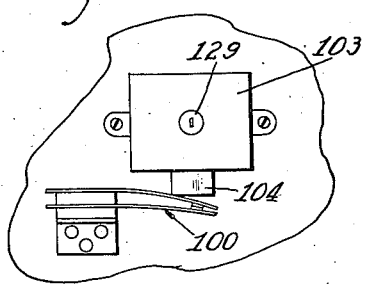
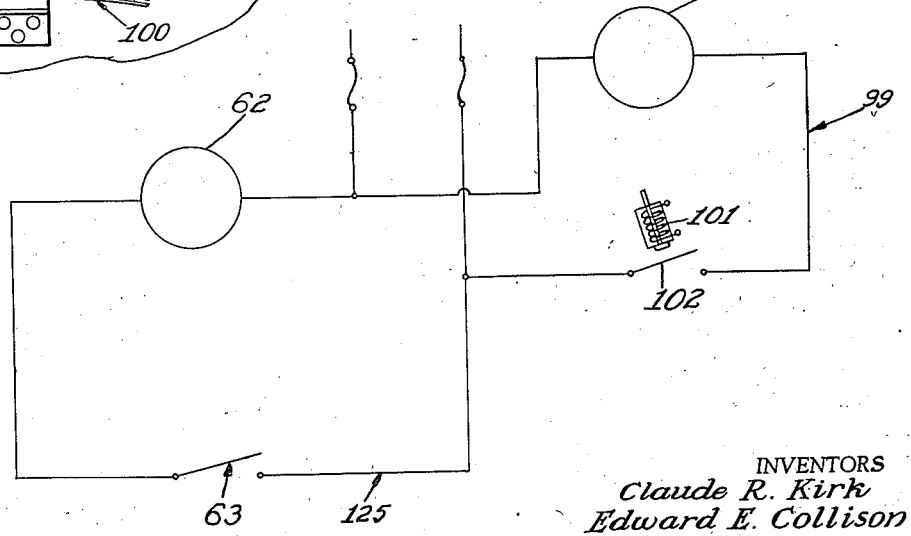
INVENTORS
Claude R. Kirk
Edward E. Collison
BY
Threedy and Connor
THEIR ATTORNEYS.

Oct. 20, 1936.  E. E. COLLISON ET AL  2,057,880

VENDING MACHINE

Filed May 1, 1935  5 Sheets—Sheet 5

INVENTORS
Claude R Kirk
Edward E Collison
BY
Threedy and Cannon
THEIR ATTORNEYS.

Patented Oct. 20, 1936

2,057,880

UNITED STATES PATENT OFFICE 2,057,880

VENDING MACHINE

Edward E. Collison, Chicago, and Claude R. Kirk, Oak Park, Ill., assignors, by mesne assignments, to Exhibit Supply Company, Chicago, Ill., a corporation of Illinois Application May 1, 1935, Serial No. 19,236

16 Claims. (Cl. 312—35)

This invention relates to a vending machine.

It is an object of this invention to provide an improved vending machine which is relatively simple and inexpensive in construction and efficient in use.

Another object of the present invention is to provide a novel and improved vending machine of the so-called "crane" type.

An additional object of the invention is to construct the same in such a manner that the operating mechanism for the article-supporting turntable and article-ejecting arm of the boom, which are embodied in the present vending machine, are rendered ineffective when the turntable and article-ejecting arm are latched against operation.

A still further object of the invention is to construct the same in such a manner that the operating mechanism for the boom is automatically rendered ineffective if and when the article-ejecting arm of the boom engages a resistance greater than a predetermined resistance during its movement over the article-supporting turntable, which is embodied in the present vending machine.

Another object of the present invention is to construct the same in such a manner that the article-ejecting arm of the boom is automatically latched against movement axially along, and relative to, the boom, and the turntable is automatically latched against rotation, after the boom has moved a predetermined distance during the article-dispensing operation.

Other objects of the present invention are: to provide a vending machine of the so-called "crane" type embodying a new and improved device for preventing fraudulent operation of the machine by tilting or rocking the same from its normal and proper operating position; to provide a novel device for preventing the operator of the vending machine from "bunching" the vendible articles on the turntable thereof so as to increase the possibility that the article-dispensing or ejecting arm of the boom will engage an article and eject the same off from the turntable during the article-ejecting movement of the boom and the article-ejecting arm carried thereby; to provide a novel device for moving the dispensing or ejecting arm of the boom or crane relative to the crane or boom itself; to provide a vending machine which includes an article storage or display compartment, a turntable in said display compartment, having an article-receiving opening therein, a boom or crane movably mounted in said display or storage compartment for movement relative to and over said turntable, a member carried by and depending from said boom and movable axially therealong and relative thereto; and means including a manually operable "selector" member rotatably mounted in a wall of said cabinet for moving said turntable and the said member, which is carried by and depended from said boom, simultaneously.

Another object of the invention is to provide a vending machine of the so-called crane type which comprises a cabinet including a display or article storage compartment, a turntable rotatably mounted in the said article storage or display compartment and having an article-receiving opening formed therein, a boom movably mounted in the said display compartment for movement relative to and over said turntable, a member carried by and depending from said boom and movable axially therealong and relative thereto, and means including a manually operable member a "selector" rotatably mounted in a wall of said cabinet for simultaneously rotating said turntable and for moving said member axially along and relative to said boom.

An additional object of the invention is to provide novel means for moving the boom or crane independently of the turntable and the dispensing member carried by the boom, and to latch the turntable and the aforesaid member carried thereby against operation when the boom is in operation.

A further object of the invention is to provide a novel member rotatably mounted in the said article-receiving opening and having a portion projecting over the upper surface of the turntable, and means for rotating the said member so as to move the said portion thereof over the upper surface of the turntable into engagement with any vendible article or articles which have been fraudulently moved into a strategic or advantageous position between the said article-receiving opening and the normal or initial position of the member which is carried by and is movable axially therealong, by rocking or tilting the machine from its normal or proper operating position.

An additional object of the present invention is to provide a novel article-dispensing or ejecting arm for the boom of a vending machine of the so-called "crane" type.

Other objects will appear hereinafter.

The invention consists in the novel combination and arrangement of parts to be hereinafter described and claimed.

The invention will be best understood by reference to the accompanying drawings, showing the preferred form of construction and in which:

Fig. 1 is a perspective view of a preferred form of the new vending machine;

Fig. 2 is a vertical sectional view of the same on line 2—2 in Fig. 1;

Fig. 3 is a plan view, partly in section, on line 3—3 in Fig. 2, of the boom-operating mechanism and of the "sweep" operating mechanism;

Fig. 4 is a bottom plan view, on line 4—4 in Fig. 2, of the turntable-operating mechanism and of the operating mechanism for the boom arm;

Fig. 5 is a sectional view, on line 5—5 in Fig. 4; showing part of the operating mechanism for the boom arm and showing the device for latching the turntable against operation when the boom is in operation;

Fig. 6 is a detail view, partly in section, of the boom arm;

Fig. 7 is a front or end elevational view of the boom arm;

Fig. 8 is a top plan view of the turntable and boom, on line 8—8 in Fig. 2;

Fig. 9 is a sectional view, on line 9—9 in Fig. 4, showing the shut-off valve in the delivery chute;

Fig. 10 is a sectional view on line 10—10 in Fig. 3, showing the boom-operating mechanism;

Fig. 11 is a sectional view, on line 11—11 in Fig. 10, showing the latch mechanism for the turntable;

Fig. 12 is a diagrammatic view of an electric circuit embodied in the new vending machine and forming a part of the anti-tilting device included therein;

Fig. 13 is a sectional view, on line 13—13 in Fig. 3, showing part of the operating mechanism for the turntable sweep;

Fig. 14 is a sectional view on line 14—14 in Fig. 13;

Fig. 15 is a side elevational view of the operating mechanism for the shut-off valve in the delivery chute;

Fig. 16 is an elevational view of the key control for the turntable sweep;

Fig. 18 is a diagrammatic view of the electric circuits embodied in the new vending machine for controlling the operation of the boom-operating motor and of the motor which operates the turntable sweep;

Figure 21:
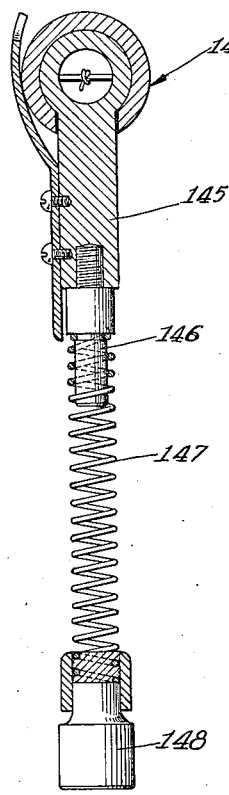
Fig. 21 is a sectional view illustrating a modified form of the article-dispensing or ejecting arm of the boom.

A preferred form of the new vending machine is shown in the drawings, is therein generally indicated at 20, and comprises a cabinet 21 which includes a display compartment 22, and a compartment 23 which is arranged below the display compartment 22 and in which the operating mechanisms for the present machine are arranged, said operating mechanisms being generally indicated at 24.

Arranged in the display compartment 22 upon the horizontal bottom wall 26 of the latter is an annular upright retaining wall 25, and rotatably mounted within the annular retaining wall 25, and within a suitable opening provided therefor in the supporting wall 26, is an article-supporting turntable 28 which is mounted in guide rollers 156 which are arranged upon the wall 26, and this turntable 28 has a ring gear 27 attached thereto on the bottom side thereof (Figs. 2 and 4).

Rotatably mounted within an opening 31 which is provided therefor in the turntable 28 is a turntable "sweep" 30 which has a portion or "nose" 32 which projects over the upper surface of the turntable 28, for reasons to be made apparent presently.

Provided in this member 30 is an article-receiving opening and pivotally mounted in the cabinet 22, as at 49 (Fig. 8), is a crane or "boom" 34, which is movable horizontally in the article storage or display compartment 23 of the cabinet 22 above the turntable 28 and carried by the boom 34, and movable axially therealong and relative thereto, is an article dispensing or ejecting member, which is generally indicated at 35. This ejecting member 35 includes an arm 120 which is pivotally mounted, as at 119, (Figs. 6 and 7), upon a depending extension of a follower 51 which is slidably mounted in the tubular boom 34 (Fig. 5); the extension 122 projecting downwardly through a slot 123 which is formed in the boom 34.

Rotatably mounted in the compartment 23 of the cabinet 22 is a horizontal shaft 36 (Fig. 4), and attached to this shaft 36, and projecting from the cabinet 22 adjacent the front wall 124 thereof is a "selector" or handle 37. Carried by the shaft 36, (Fig. 4) is a beveled gear 38 which meshes with a beveled gear 39 which is carried by a shaft 40, (Fig. 4), and the shaft 40 carries a pinion or gear 41 which meshes with the teeth 42 of the ring gear 27 which is attached to, and depends from, the turntable 28, (Figs. 4 and 9).

Interposed in the "selector" or turntable operating shaft 36 is a so-called "slip" or friction clutch which is generally indicated at 43, (Figs. 4 and 19), and which will be explained hereinafter.

The operator of the present vending machine may move or rotate the turntable 28 and a vendible article 68 carried thereby, (Fig. 8), into any preselected position by manipulating the "selector" or handle 37, this movement of the "selector" 37 being transmitted, by way of the shaft 36 and the safety or slip clutch 43 which is embodied therein, through the gears 38 and 39 to the shaft 40, and thence to the gear 41 which meshes with the teeth 42 of the ring gear 27 which is carried by the turntable 28.

Meshing with the teeth 42 of the ring gear 27 is a gear 44, (Fig. 4), which is carried by a horizontal shaft 45 and attached to this shaft 45 is an arm 46, (Figs. 4 and 5), and attached to this arm 46 at the radially outer end thereof, and eccentrically relative to the shaft 45, (Figs. 4 and 5), is a flexible power-transmitting member 47. This flexible member 47 works around a guide roller or sheave 48 (Fig. 5), and extends upwardly through a tubular vertically extending member 49 upon which the boom 34 is mounted, (Fig. 5). The flexible member 47 is also extended around a second guide roller or sheave 50, (Fig. 5), which is arranged at the junction of the upright support 49 and the horizontally extending crane arm or boom 34, and the flexible member 47 is extended through the tubular boom or crane 34, as shown in Fig. 5; the upper end portion of the flexible member 47 being attached to the follower 51 which is slidably mounted in the tubular boom 34, (Figs. 5 and 6).

Arranged in the tubular boom 34, is a coil spring 52, and one end of this coil spring 52 is attached to the follower 51; the other end of the coil spring 52 being fixed in the boom 34 at the axially outer end of the latter, (Fig. 5).

The coil spring 52 normally acts upon the follower 51 to move the latter and the article dispensing or ejecting arm 35, which is carried thereby, axially along the boom 34 toward the axially outer end of the latter. However, when the turntable 28 is rotated, by manipulation of the "selector" or handle 37, and the associated parts 36—43—38—39—40—41—42, and 27, the gear 44 is likewise rotated, since this gear 44 meshes with the teeth 42 which are provided on the bottom edge of the ring gear 27 which is carried by the turntable 28. This movement of the gear 44 acts, through the shaft 45, to rotate the eccentric arm 46 carried thereby, (Fig. 5), and as the eccentric arm 46 is rotated (from dotted to full line position, Fig. 5) it acts, through the flexible element 47, to withdraw the follower 51 and the article ejecting or dispensing arm 35 carried thereby axially along the boom 34 toward the inner end thereof, (right to left, Fig. 5), against the action of the spring 52; and during the other half of its cycle or revolution, that is, when the eccentric arm 46 is moving from full to dotted line position, Fig. 5, the tensioned spring 52 acts upon the follower 51 and the article dispensing or ejecting arm 35 to move the latter axially along the boom 34 toward the axially outer end thereof. In this manner the article dispensing or ejecting arm 35 is caused to reciprocate or move alternately back and forth along the boom 34 as the turntable 28 is rotated by the operator through the manipulation of the "selector" or handle 37.

As hereinbefore stated, the boom 34 is mounted upon an upright tubular supporting member 49 which is rotatably journalled in the partition 26 of the cabinet 21, (Fig. 5), and attached to the supporting member 49 is a vertical shaft 53 which extends downwardly through the compartment 23 of the cabinet 21. Attached to the shaft 53, adjacent the lower end of the latter, is a horizontally extending arm 54, (Figs. 3 and 10). Pivotally connected to this arm 54, as at 55, is a link 56 and pivotally connected to the link 56, as at 57, is an arm 58 which is carried by a shaft 126, (Figs. 3 and 10).

Interposed or embodied in the shaft 53 is a socalled "slip" clutch, which is generally indicated at 131, (Fig. 5), this clutch 131 being the same in construction as the clutch 43, (Figs. 4 and 19), and its purpose will be explained hereinafter.

Carried by the shaft 126 is a gear 59 and meshing with the gear 59 is a worm 60 which is carried by a horizontal shaft 61 which, in turn, is operated by an electric motor 62 (Figs. 3 and 10).

The motor 62 is arranged in an electric circuit 125 which is controlled by a mercury switch of conventional or known design and which is generally indicated at 63, (Fig. 10), and which forms no part of the present invention. This switch 63, (Fig. 10), includes a trip or circuit-closing member 64 which is arranged below a gravity coin chute 65, (Fig. 10), and this coin chute 65 is adapted to receive coins, or tokens, one at a time, from a coin slide 66 which is slidably mounted in the front wall 124 of the cabinet 21.

The foregoing arrangement is such that when a suitable coin or token is deposited in the coin aperture of the coin slide 66 and the latter is pushed inwardly (right to left, Fig. 10), the coin or token will drop from the coin slide 66 into the coin chute 65 and, upon falling down the coin chute 65, will engage the trip 64, thereby actuating the mercury switch 63 to close the circuit 125 and thus set the boom-operating motor 62, which is arranged in the circuit 125, (Fig. 18) into operation. The motor 62 being thus set in operation, acts, through the mechanisms 61—60—59—58—57—56—55—54—53, (Figs. 3 and 10), to rotate the vertically extending supporting shaft 49 and the boom 34 carried thereby a predetermined circumferential distance, (from full to dotted line position, Fig. 8). During this movement of the boom 34, the article dispensing or ejecting arm 35, which is carried thereby, moves through a mouth or opening 67 which is provided in the annular retaining wall 25, (Fig. 8), and the article dispensing or ejecting arm 35 moves radially across the turntable 28 above the latter. During this movement of the boom 34 and the article-dispensing or ejecting arm 35, (from full to dotted line position, Fig. 8), the article-dispensing or ejecting arm 35 may engage an article of merchandise, indicated at 68, Fig. 8, which is disposed upon the turntable 28, and move or push the latter into the mouth 84 of the article dispensing or opening outlet 127 which is provided in the member or "sweep" 30—32, whereupon the article thus moved over the turntable into the dispensing outlet 127 will drop into an inclined article dispensing chute 69, which is arranged in the cabinet 21 below the article storage or display compartment 22; the thus dispensed or vended article falling by gravity down the delivery chute 69 to an article delivery door 70 which is hingedly mounted in the cabinet 21 on the inner side of the front wall 124 thereof and at the bottom of the delivery chute 69, (Fig. 2).

During the remaining half of its cycle, (from dotted to full line position, Fig. 8), the boom 34 and the article dispensing or ejecting arm 35 carried thereby pivot back into their initial position (from dotted to full line position, Fig. 8), this movement of the boom 34 and the arm 35 carried thereby being effected by the motor 62, in conjunction with the mechanism 61—60—59—58—57—56—55—54—53, and 49, and at the end of this operation the mercury switch 63 acts to open the circuit 125 to the motor 62, thereby stopping the boom 34 and the dispensing arm 35 carried thereby in their initial position, as in full lines, Fig. 8.

Pivotally mounted in the cabinet 21, as at 71, (Figs. 5 and 10), is a latch member 72 which includes an arm 73 and this arm 73 has an end portion 74, and this end portion 74 is adapted to latchingly engage with the teeth 42 which are provided on the bottom edge of the ring gear 27 which is attached to the turntable 28, thereby latching the turntable 28 and the article ejecting member 35 against operation.

Carried by the vertical shaft 53, which operates the boom 34, is a latch keeper arm 75 which is normally disposed in engagement with an arm 76 of the latch member 72 and when the shaft 53 is operated in a direction to move the boom 34 (clockwise, from full to dotted line position, Fig. 8) the arm 75 moves away from or disengages the depending arm 76 of the latch member 72, and thereby allows the latter to pivot, by gravity, in a direction (counterclockwise, Fig. 5) to raise the end portion 74 of the arm 73 of the latch member 72 into latching engagement with the teeth 42 of the ring gear 27, thereby latching the turntable 28 and the article-ejecting arm 35 of the boom 34 against operation while the boom 34 is in operation.

However, as the boom 34 returns to its initial position, (as in full lines, Fig. 8), the keeper arm 75 again engages the counterweighted or depending arm 76 of the latch member 72 and thereby pivots the latch member 72 in a direction (clockwise, Fig. 5) to move the end portion 74 of the arm 73 thereof out of latching engagement with the teeth 42 of the ring gear 27 so as to permit operation of the turntable 28 and the article ejecting arm 35 when the boom 34 is in its normal or initial position, as in full lines, Fig. 8.

The latch keeper arm 75 is movable between two stops 136 and 137, (Fig. 11), for reasons to be explained hereinafter.

When the present vending machine is in use, the operator may attempt to tilt or rock the machine so as to position one or more of the vendible articles of merchandise 68 advantageously, that is, in a position, upon the turntable 28, from which they may, with comparative ease, be dispensed by manipulating the "selector" or handle 37. In other words, the operator may attempt to rock or tilt the machine so as to "bunch" or group the vendible articles 68 at position "C" on the turntable 28, (Fig. 8), which is a position adjacent the mouth or lower open end 84 of the dispensing opening or outlet 127 which is provided in the member 30, so as to increase the likelihood that the article ejecting or dispensing arm 35 on the boom 34 will engage one of the vendible articles 68, (thus fraudulently positioned adjacent the mouth of the dispensing outlet 127, Fig. 8), and push the same through the mouth 84 of the dispensing outlet 127 so that the same will fall into the article delivery chute 69—70.

However, if the player or operator attempts to rock or tilt the present vending machine so as to bunch or group the vendible articles 68 at the open lower end 84 of the dispensing outlet 127, a pendulum 77 (Fig. 10), which is mounted on the front wall 124 of the cabinet 21, will engage a stationary contact 78, (Fig. 12), which is arranged in an electric circuit 79, (Fig. 12), and thereby actuate an electromagnet 80 which is likewise arranged in the circuit 79, (Fig. 12).

When the electromagnet 80 is actuated it attracts to itself a member 81 which is pivotally mounted between its ends on the chute 69, as at 82, (Fig. 10), thereby causing a notched end portion 83 (which is formed in the member 81, Figs. 10 and 15), to move out of latching engagement with a pin or lug 86 which works in a slot 128, (Fig. 15), which is formed in a side wall of the chute 69. This lug is carried by and projects laterally from, a shut-off gate 87 which is pivotally mounted in the chute 69, thereby allowing the gate 87 to pivot, by the action of a spring 88, (Fig. 15) (from full to dotted line position, Fig. 2); the gate 87 being normally held, (in full line position, Fig. 2), by the latching engagement of the notched portion 83 of the latch member 81 with the pin or lug 86, and in which latter position the gate 87 permits the passage of articles down the delivery chute 69; it being noted that when the gate 87 is disposed, (as in dotted line position, Fig. 2, full line position, Fig. 15), it prevents the passage of the vendible articles 68 down the delivery chute 69.

In the foregoing manner the anti-tilting device (77—78—79—80—81—82—83—86—87—88) prevents fraudulent operation of the present vending machine by the operator by rocking or tilting the same from its normal and proper operating position; and the gate 87 is held in effective position, as shown in full lines, Fig. 15, dotted lines, Fig. 2, blocking the passage of vendible articles 68 down the delivery chute 69, until a key-controlled lock 103, (Fig. 16), is actuated, by the proprietor of the machine, to cause rotation of the "sweep" member 30, over the turntable 28, so as to remove from in front of the open lower end 84 of the dispensing outlet 127 any article 68 which may have been fraudulently positioned or bunched together at this strategic point by rocking or tilting the machine from its normal or proper operating position.

Provided in the turntable 28 is a central opening 31 (Fig. 9), in which the "sweep" or outlet member 30 is arranged and this member 30 is attached to a ring gear 90 which is arranged below the turntable 28, the member 30 being movable relative to and over the upper surface of the turntable 28.

Meshing with the ring gear 90, to which the "sweep" member 30 is attached, is a gear or pinion 91 which is mounted on the upper end portion of a vertical shaft 92, (Figs. 4 and 9). At its lower end this shaft 92 carries a beveled gear 93, (Fig. 14), which meshes with a beveled gear 94 which is carried by a horizontal shaft 95, (Fig. 14). Mounted on the shaft 95 is a gear 96 which meshes with a gear 97 which is attached to the shaft of an electric motor 98, (Figs. 2, 3, and 14).

The motor 98 is arranged in an electric circuit 99, (Fig. 18), associated with this circuit 99 is a circuit 153, (Fig. 17), which includes a key-controlled switch 100, (Fig. 16), which may be mounted at any suitable point in the cabinet 21 for access by the proprietor thereof. Embodied in the circuit 153 is a solenoid 101 with which is associated a pivoted knife switch 102, (Fig. 13).

The foregoing arrangement is such that when the proper key is inserted into the lock cylinder 129 of the key-controlled lock 103, (Fig. 16), so as to extend the bolt 104, the switch 100 is closed, thereby closing the circuit 153 and actuating the solenoid 101 and thus causing the movable element 108 of the latter to engage the end portion 130 of the knife switch 102 and pivot the latter (from full to dotted line position, Fig. 13), into engagement with contacts 118, thereby closing the circuit 99 to the motor 98, and thus setting the latter in operation.

When the motor 98 is set in operation, power is transmitted from the same, by way of the parts 97—96—95—94—93, and 92, to the pinion 91, and from the latter to the ring gear 90, thereby causing the ring gear 90 and the member or "sweep" 30 carried thereby to rotate, thus moving the end portion or "nose" 32 of the member 30 relative to and over the upper surface of the turntable 28, (Fig. 8).

When the end portion 32 of the member 30 is thus moved over the upper surface of the turntable 28, it engages any of the vendible articles 68 which may have been fraudulently positioned or bunched together on the turntable 28, at position "C", (Fig. 8), in the path of movement of the boom arm 35, and thus moves these articles out of this strategic or advantageous position in which they may have been positioned by an attempted fraudulent operation of the machine.

Attached to the shaft 95 is a pinion 109, (Fig. 13), which meshes with a gear 110, (Figs. 13 and 14), and mounted on one lateral side of the gear 110 is a segmental conductive contact plate 106, (Fig. 13), in which is provided, a cut-out portion or interruption 107, and engaging with this contact plate 106 are two electrically conductive contact arms 105, these parts 106 and 105, being embodied in the circuit 99.

Carried by, and projecting laterally from, the gear 110 is a pin 111 and when the circuit 99 has been closed by the engagement of this movable element 108 of the solenoid 101 with the end portion 130 of the knife switch 102 and the consequent engagement of the end portion 139 of the knife switch 102 with the contacts 118, thereby setting the motor 98, the "sweep" 30—32, and the ring gear 110 in operation, the pin 111 engages the arm 112 of the knife switch member 102 and pivots the latter into open position, (from dotted to full line position, Fig. 13); whereupon, the engagement of the contact or upper arms 105 with the conductive plate 106 keeps the circuit 99 closed and the motor 98 and the "sweep" 30 in operation. However, when the "sweep" 30—32 reaches its normal or initial position, (as in Fig. 8), the contact arms 105 fall into the opening or cut-out portion 107 which is provided in the contact plate 106 and thereby open the circuit 99 to the motor 98, thus stopping the "sweep" 30 in its normal or initial position, as in Fig. 8.

As the outlet member or "sweep" 30 reaches its normal or initial position, (as in Fig. 8), a depending arm 113, which is attached to the ring gear 90, on the bottom side of the latter, (Fig. 15), engages an arm 114 of the shut-off valve 87 and thereby pivots the latter, (clockwise, Fig. 15), back into its normal or initial position, as in full lines, Fig. 2, thus opening the delivery chute 69 for the passage of vendible articles therealong from the dispensing outlet 127 in the turntable 28 to the dispensing outlet 70 of the cabinet 21.

Figure 19:
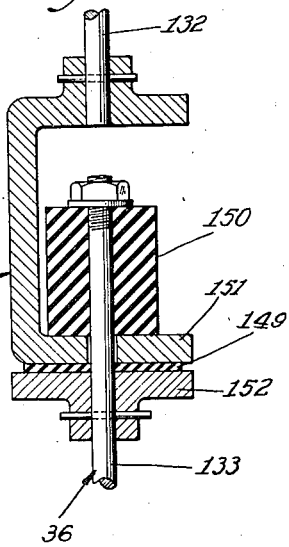
Fig. 19 is a sectional view illustrating a preferred form of a so-called "slip" or friction clutch which is embodied in the present vending machine.

The "slip" or friction clutches 43 (Fig. 4) and 131 (Fig. 5), being identical in construction, only one of the same will be described and to this end the clutch 43, shown in detail in Fig. 19, will now be described.

This "slip" or friction clutch 43 comprises a clutch face 151 which is attached to the portion 132 of the turntable-operating shaft 36, and this clutch 43, also includes a clutch face 152 which is attached to the portion 133 of the turntable-operating shaft 36.

Arranged between the clutch faces 151 and 152 is a friction lining or rubber disc 149 and mounted, under compression, upon the shaft portion 133 is a resilient member in the form of a rubber block 150, which is seated upon the clutch face 151.

The operation of these clutches 43 and 131 will be explained in detail hereinafter.

Figure 20:
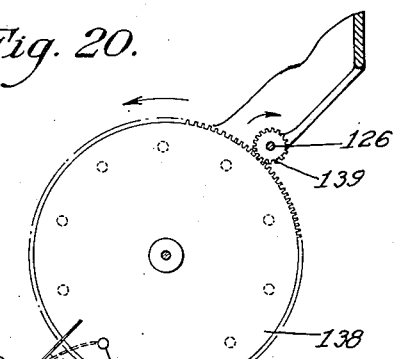
Fig. 20 is a plan view on line 20—20 in Fig. 10, illustrating a mechanism for automatically operating the turntable "sweep" after a pre-determined number of operations of the boom.

Carried by the shaft 126 (Figs. 10 and 20) is a small gear or pinion 139 which meshes with a larger and timing gear 138 (Figs. 10 and 20) and carried by the timing gear 138 is a projection or pin 140 which is engageable with a contact 141 (Figs. 17 and 20); this contact 141 and a second contact 142, which is associated therewith, forming part of an auxiliary control switch 143 for operating the solenoid 101—108 and the control switch 102 for the sweep-operating motor 98 automatically and independently of the key-controlled lock and switch 100—103—104—129 (Fig. 16).

Figure 17:
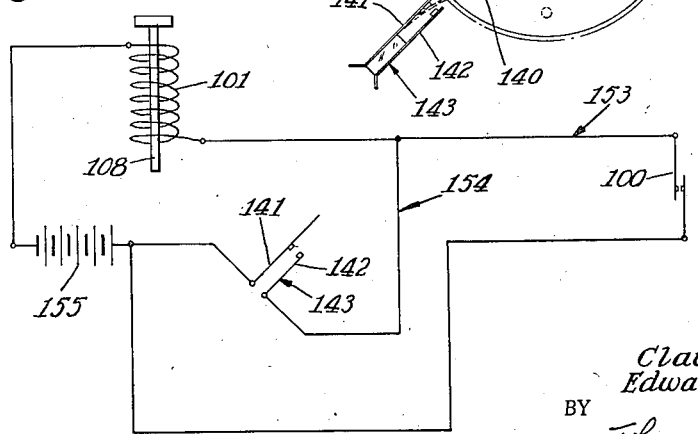
Fig. 17 is a diagrammatic view of an electric circuit embodied in the new vending machine and associated with the key control and automatic control for the turntable sweep.

The auxiliary control switch 143—141—142 for the sweep-operating motor 98 is embodied in an auxiliary circuit 154 which is associated with the solenoid 101—108, as shown in Fig. 17, and this auxiliary circuit 154 includes a suitable source of current 155, which may be a battery of dry cells arranged in the cabinet 21.

The operation of this auxiliary and automatic control device for the motor 98 will be explained more fully hereinafter under the statement of operation now to be set forth.

*Operation*

When the present vending machine is in use, a supply of vendible articles of merchandise 68 are kept upon the turntable 28 and prior to the time that the player or operator inserts a coin into the coin slide 66, to operate the boom 34, the player may rotate the turntable 28 a predetermined circumferential distance, by manipulating the "selector" or handle 37, so as to dispose a preselected one of the vendible articles 68, which are disposed upon the turntable 28, in an advantageous or strategic position between the opening 67 in the annular retaining wall 25, which encircles the turntable 28, (Fig. 8), and the open lower end or outlet 84 to the dispensing outlet member 30—32—127, so that when the boom or crane 34 is pivoted from its normal or initial position, (as in full lines, Fig. 8), into its effective or dispensing position, (as in dotted lines, Fig. 8), the dispensing arm 35, which is carried by the boom or crane 34, may engage the preselected article of merchandise 68, which has previously been disposed between the opening 67 in the retaining wall 25 and the open lower end 84 of the outlet member 30, and thereby push the same into the outlet 127 through the said open lower end 84 thereof; whereupon the thus dispensed article will drop through the outlet 127 into the delivery chute 69, from which it may be taken by opening the door 70, which is arranged at the lower end of the delivery chute 69.

When the player rotates the "selector", or handle 37, this movement of the same is transmitted to the turntable 28, by way of the shaft 36—43, gears 38—39, shaft 40, and gears 41—42, (Fig. 4).

And when the turntable 28 is thus rotated, by operation of the "selector" 37, the gear 44 is likewise rotated, being in mesh with the ring gear 27 which is provided on the bottom side of the turntable 28, and this movement of the gear 44 is transmitted, by way of the shaft 45, to the eccentric arm 46, thereby rotating the latter, (Fig. 5). As the eccentric arm 46 is thus rotated, it acts through the flexible element 47, to move the follower 51, and the ejecting or dispensing arm 35 which is carried thereby, (right to left, Fig. 5), relative to, and axially along, the boom or crane 34, against the action of the resetting spring 52; and as the eccentric arm 46 moves through the other half of its revolution or cycle, (from full to dotted line position, Fig. 5), the tensioned resetting spring 52 acts upon the slidable follower 51 and the dispensing or ejecting arm 35 which is carried thereby, to move the latter axially along and relative to the boom or crane 34, (left to right, Fig. 5). In this manner the dispensing or ejecting arm 35 is alternately moved or reciprocated back and forth axially along, and relative to, the boom or crane 34, across the opening 67 in the retaining wall 25 which encircles the turntable 28, (from position "A" to position "B", Fig. 8, and vice versa), thereby making it relatively difficult for the operator of the machine to manipulate the turntable 28 so as to dispose a preselected article 68 carried thereby, in advantageous or strategic position, in alignment with the opening 67 in the retaining wall 25, and, simultaneously therewith, to position the dispensing arm 35 at such a point on the boom 34, and relative to the opening 67 in the retaining wall 25, that it (the dispensing arm 35) will engage the desired or preselected article 68 on the turntable 28 and push the same into the dispensing outlet 127 when the boom 34 is moved, from its normal or initial position into effective or dispensing position.

In this manner the "hazard" of success, and the suspense involved, in operating the present machine, and also the operator's interest, are increased, since it is relatively difficult for the player, by manipulating the "selector" 37 to rotate the turntable 28 the exact circumferential distance, necessary to bring the preselected article 68 thereon into a position between the opening 67 in the retaining wall 25 and the open lower end 84 of the outlet member 30 and, at the same time, to position the dispensing arm 35 at a point on the boom or crane 34 where it will engage the thus positioned and preselected article in such a manner as to push the same off from the turntable 28 into the outlet 127 when the boom 34 is moved from its normal or initial position, into effective or dispensing position, since if the selector arm 35 is positioned on the boom 34, to either side of a line extending substantially radially from the center of the outlet 127, through the center of the preselected article 68 which is disposed on the turntable 28 between the outlet 30 and the opening 67 in the retaining wall 25, the selector arm 35 will, when the boom or crane 34 is moved inwardly, (from full to dotted line position, Fig. 8), engage the article 68 in such a manner that it will push the same, upon the turntable 28, either to one side or the other, and will not push the same into the outlet 127.

After the player has made the desired article selection, by manipulating the selector 37 and turntable 28, in the manner above set forth, and has arranged the selector arm 35 in a preselected position upon the boom 34, he may insert a suitable coin or token into the coin aperture of the coin slide 66, and, by pushing the coin slide 66 inwardly, cause the coin or token to drop from the slide 66 into the chute 65.

When the coin or token drops into the chute 65 it falls upon the trip 64, which forms part of the mercury switch mechanism 63, (Fig. 10), and thus closes circuit to the motor 62, (through the operation of the switch 63 which forms no part of the present invention), whereupon power is transmitted from the motor 62, through the shaft 61, and worm 60, to gear 59, (Figs. 3 and 10), and thence by way of the parts 58—57—56—55, and 54 to the vertical shaft 53—49, (Fig. 5), thereby rotating the latter and the boom or crane 34, which is carried thereby, a predetermined circumferential distance, (from full to dotted line position, Fig. 8). This movement of the boom or crane 34, causes the dispensing arm 35 carried by the boom 34 to move through the opening 67 which is provided in the annular retaining wall 25 and, perchance, into engagement with a preselected article of merchandise (68) which has previously been disposed, by manipulation of the article "selector" 37 and turntable 28, in a position between the opening 67 in the retaining wall 25 and the open lower end 84 of the outlet member 30; whereupon the preselected article (68) may either be pushed into the dispensing outlet member 30, through the open lower end 84 of the latter, or it may be pushed to one side by the dispensing or ejecting arm 35, and fail to enter the dispensing outlet 127.

As the boom or crane 34 completes its cycle of movement, the angled end portion 117 of the resetting arm 115, which is pivotally connected, as at 116, to the arm 54, (Fig. 3), engages the trip 64 and resets the same back into its initial position, thereby opening the circuit to the motor 62 which operates the boom 34, and thus stopping the boom 34 in its normal or initial position, (as in full lines, Fig. 8).

As hereinbefore stated, the operator of the present vending machine may, by tilting or rocking the same, attempt to bunch or group the various articles of merchandise 68, which are disposed upon the turntable 28, at an advantageous or strategic point between the open lower end 84 of the outlet member 30 and the opening 67 in the retaining wall 25, so as to increase the probability that the dispensing arm 35 of the boom 34 will, when it moves through the opening 67 in the retaining wall 25, and over the upper surface of the turntable 28, engage one of the several articles thus bunched or grouped together (at position "C", Fig. 8) and push the same into the dispensing outlet 127.

However, if the operator of the machine, thus attempts to bunch or group the vendible articles 68 on the turntable 28 (in position "C", Fig. 8), by tilting or rocking the machine, the pendulum 77, (Fig. 10), will engage the stationary contact 78 which is associated therewith, in the circuit 79, (Fig. 12), and thus close the circuit 79 to the electromagnet 80, whereupon the electromagnet 80, being thus actuated, will attract the latch member 81 and thereby pivot the latter, at 82, (from full to dotted line position, Fig. 10). This movement of the latch member 81, (from full to dotted line position, Fig. 10), causes the notched portion 83 thereof to move out of latching engagement with the lug 86 which is attached to the shut-off gate 87, whereupon the shut-off gate 87 is pivoted by the spring 88 from its normal or ineffective position in the delivery chute 69, (as in full lines, Fig. 2), into effective position (as in dotted lines, Fig. 2), and when the shut-off gate 87 is thus disposed, (as in dotted line position, Fig. 2), it prevents any of the vendible articles of merchandise 68, which may be caused to enter the outlet 127 from the turntable 28, from passing down the delivery chute 69 to the outlet door 70 thereof, and shunts the same out of the delivery chute 69 into the compartment 23 of the cabinet 21, thereby effectively preventing a fraudulent operation of the machine by rocking or tilting the same, since even if the operator is successful in fraudulently ejecting an article 68 off from the turntable 28 into the dispensing outlet 127, by rocking or tilting the machine, the said article will not be delivered to the operator but will be shunted by the shut-off gate 87 out of the delivery chute 69 into the compartment 23 of the cabinet 21.

If the operator of the present machine has attempted to operate the same fraudulently, by rocking or tilting the same from its normal or proper operating position, so as to bunch or group the vendible articles 68 into an advantageous position on the turntable 28, (as at "C" position, Fig. 8), the proprietor of the machine may rotate the outlet member or "sweep" 30 so as to sweep the thus bunched or grouped articles which have been fraudulently positioned at "C" upon the turntable 28, (Fig. 8), by inserting a proper key into the lock cylinder 129 of the lock 103, (Fig. 16), so as to extend the latch bolt 104, (Fig. 13).

This movement of the latch bolt 104 causes the same to engage and close the switch 100, (Fig. 16), to the circuit 99, (Fig. 17), thereby actuating the solenoid 101, whereupon the movable element 108 of the solenoid 101, (Figs. 13 and 17), is moved into engagement with the end portion 130 of the knife switch member 102, thus moving the latter into engagement with the "knife" contacts 118, (Fig. 13), and thereby closing the circuit 99 to the motor 98, around, that is, independently of, the wiper contacts 105.

However, when the motor 98 and the gear 110 commence to rotate, the segmental conductive plate 106 moves into engagement with the contacts 105, and at this time the pin 111 on the gear 110 engages the end portion 112 of the pivotal mounted member 102 and thereby pivots the end portion 130 of the latter out of engagement with the knife contacts 118, into its normal or initial position, as in full lines, Fig. 13.

When the circuit 99 is thus closed, the motor 98 arranged therein is set in operation, and power is thereupon transmitted from the motor 98 by way of the gears 97 and 96 to shaft 95 to gears 94—93, to shaft 92, (Figs. 3 and 14), thereby rotating the shaft 92 and the pinion 91 carried thereby, and thus rotating the ring gear 90, (Fig. 4), with which the pinion 91 meshes.

The foregoing movement of the ring gear 90 also moves the outlet member or "sweep" 30 carried thereby, (Fig. 9), and the "nose" portion 32 of the outlet member or "sweep" 30 is thus rotated relative to and over the upper surface of the turntable 28. The member 30 thus acts as a sweep and removes from the strategic position "C" on the turntable 28 any article or articles 68 which may have been fraudulently moved into that position, (as at "C", Fig. 8), by rocking or tilting the machine from its normal or proper operating position.

As the "sweep" 30 completes its revolution over the turntable 28, and approaches its normal or initial position (as in Fig. 8), the depending arm 113 which is carried by the ring gear 90, (Figs. 9 and 15), engages the arm 114 of the shut-off gate 87 and thereby pivots the shut-off gate 87, against the action of the spring 88 from its effective position, (as in Fig. 15, from dotted to full line position, Fig. 2), so that any vendible article which may enter into the delivery chute 69 from the turntable outlet 127, may travel down the delivery chute 69, past the gate 87, to the article delivery door 70 which is located at the lower end of the delivery chute 69.

At this time the lug 86 in the shut-off gate 87 again moves into latching engagement with the notched portion 83 of the latch member 81, thereby retaining the latter latched in its normal or ineffective position, (as in full lines, Fig. 2).

The end portion 74 of the latch member 73, (Fig. 5), is normally disposed out of latching engagement with the teeth 42 of the ring gear 27, so that the turntable 28 and dispensing arm 35 of the boom 34 may be operated by moving the selector 37. However, when a proper coin or token is inserted into the coin aperture of the coin slide 66 and the latter is pushed inwardly, (right to left, Fig. 10), setting the motor 62, shaft 53—49 and the boom 34 in operation, in the manner hereinbefore described, the latch keeper arm 75 which is carried by the shaft 53 disengages the depending or counterweighted arm 76 of the latch member 72 which thereupon pivots by gravity (from dotted to full line position, Fig. 10), thus moving the end portion 74 of the latch member 73 into latching engagement with the teeth 42 of the ring gear 27, and thereby latching the turntable 28 and the dispensing or ejecting arm 35 against operation while the boom or crane 34 is in operation. In this manner the operator of the present machine is prevented from operating either the turntable 28 or the boom arm 35 while the boom or crane 34 is in operation, and hence the operator is prevented from manipulating the turntable 28 in such a manner as to move a preselected vendible article 68 thereon into the path of the boom arm 35, while the boom 34 is in operation.

However, when the boom or crane 34 has returned to its normal or initial position, the latch keeper arm 75 which is carried by the shaft 53, engages the counterweighted or depending portion 76 of the latch member 73, thereby pivoting the end portion 74 of the arm 73 out of latching engagement with the teeth 42 of the ring gear 27, thereby permitting operation of the turntable 28 and the boom arm 35 when the crane or boom 34 is in its normal or idle and initial position, (as in full lines, Fig. 8).

It will be noted, (Figs. 6 and 7), that when the article-ejecting or dispensing arm 35 of the boom 34 is moved during the article-ejecting operation, the portion 121 of the article-ejecting arm 35 will bear against the depending portion 122 of the follower 51, (Fig. 6), if the depending portion 120 of the article-ejecting arm 35 engages an article 68 which is disposed on the turntable 28, and this engagement of the portion 121 of the arm 120 prevents the latter from being pivoted, at 119, during the article-dispensing operation, that is, when the boom 34 and the article-ejecting arm 35 carried thereby are moved from full to dotted line position, Fig. 8.

However, when the boom 34 and the article-ejecting arm 35 move back toward their initial position, the depending portion 120 of the boom arm 35 will, if it engages an article 68 disposed upon the turntable 28, pivot at 119, (clockwise, Fig. 6), thus allowing the portion 120 of the boom arm 35 to pass over any article or articles 68 which are disposed upon the turntable 28 and which it may engage during its return stroke.

If the operator of the machine fraudulently or otherwise causes the vendible articles 68 to pile or bunch up on the turntable 28 in the path of movement of the article-ejecting arm 35, as at position "C", (Fig. 8), the article-ejecting boom arm 35 will, when it engages the vendible articles 68 thus piled up or bunched together on the turntable 28, act upon the "slip" clutch 131, (Fig. 5), to stop the motion of the boom 34 and its article-ejecting arm 35, thereby preventing the operator of the machine from fraudulently operating the same, as well as from breaking or rupturing the machine. This result is accomplished by reason of the fact that when a resistance greater than predetermined resistance is offered to movement of the boom arm 34, as happens when the article-ejecting arm 35 of the boom 34 engages a bunch of the vendible articles 68 which have been fraudulently or otherwise piled up upon the turntable 28, rather than only one of the same, the "slip" clutch 131 effects an operative disconnection between the parts 134 and 135 of the operating shaft 53 for the boom 34 (Fig. 5).

The slip clutch 43 prevents the operator of the machine from operating either the article-ejecting arm 35 of the boom 34 or the turntable 28 when the boom 34 is in operation, (during which time the said turntable 28 and the article-ejecting arm 35 of the boom 34 are latched against the operation by the engagement of the end portion 74 of the arm 73 of the latch member 72, (Fig. 5), with the teeth 42 of the ring gear 27), since if the operator of the machine attempts to operate the turntable 28 and the article-ejecting arm 35 of the boom 34 when the boom 34 is in operation, by manipulating or rotating the "selector" 37, the "slip" clutch 43, (Fig. 4), will effect an operative disconnection between the portion 133 of the shaft 36 which carries the "selector" handle 37 and the portion 132 of the said shaft 36 with which are associated the turntable driving gears 38—39, etc., (Fig. 4).

The resiliency of the compressed rubber block 150 is normally sufficient to urge the clutch faces 151 and 152 into engagement with the friction lining 149, disposed therebetween with sufficient force to cause the clutch faces 151 and 152 and their complementary supporting shafts 132 and 133, respectively to turn as a unit when the turntable 28 is free to rotate; that is, when the end portion 74 of the latch member 72—73 is disposed out of latching engagement with the teeth 42 of the ring gear 27.

However, when the end portion 74 of the latch member 72—73 is disposed in latching engagement with the teeth 42 of the ring gear 27, any attempt by the operator of the machine to rotate the turntable 28, or to operate the article-ejecting arm 35 of the boom 34, by manipulating the selector 37, will cause the clutch face 152 to slip over and relative to the friction lining 149, against the action of the resilient member or rubber block 150, thus operatively disconnecting the portion 133 of the turntable operating shaft 36 from its complementary portion 132 and thereby preventing operation of the turntable 28 and the article-ejecting arm 35 of the boom 34.

The clutch 131, being identical in construction to the clutch 43, functions in a manner similar to that above set forth for the operation of the clutch 43, and operatively disconnects the complementary portions 134 and 135 of the boom-operating shaft 53 when the article-ejecting arm 35 of the boom 34 engages a resistance, which is greater than a predetermined resistance, and which may be caused, for example, by the operator of the machine fraudulently bunching the vendible articles 68 upon the turntable 28, at position "C", Fig. 8, as hereinbefore explained.

The boom-operating shaft 53 and its associated mechanism 54—55—56—58, etc., act, through the shaft 126 (Figs. 10 and 20), to rotate the small gear or pinion 139 which meshes with the timing gear 138, so as to rotate the timing gear 138 a predetermined circumferential distance every time the boom 34 is operated; and after a predetermined number of operations of the boom 34, the projection 140 carried by the timing gear 138 engages the contact 141 of the switch 143 and forces the latter into engagement with the contact 142, thereby closing the switch 143 and the auxiliary circuit 154 to the solenoid 101—108 automatically and independently of the key-controlled lock and switch 103—129—104—100, respectively.

When the solenoid 101—108 is thus actuated, the movable element 108 of the same engages the end portion 130 of the switch member 102 and thereby forces the latter into engagement with the contacts 118 (Fig. 13), thus closing circuit to the motor 98 so as to operate the "sweep" 32 and thereby move the same over the upper surface of the turntable 28 automatically after a predetermined number of operations of the boom 34.

In this manner the turntable 28 is "cleared" at predetermined intervals and the vendible articles 68 arranged upon the turn table 38 are thus, from time to time, swept away from position "C", at the mouth of the article-ejecting outlet 127, in which position they may have been arranged by the operator of the machine either fradulently or otherwise.

The movement of the latch operating arm or keeper 75, which is carried by the boom operating shaft 53 (Fig. 11) is limited by two spaced stops 136 and 137 (Fig. 11) and when the boom 34 is in its normal or initial position (as in full lines, Fig. 8) the latch keeper arm 75 is disposed in engagement with the stop 137, whereas when the boom 34 is disposed in its effective or article-ejecting position the latch keeper arm 75 is disposed in engagement with the stop 136 (as in dotted lines Fig. 11).

If the operator of the machine fraudulently moves the boom 34 into its effective or article-ejecting position (as in dotted lines, Fig. 8) by rocking or tilting the machine, and then sets the boom-operating motor 62 in operation (by operating the coin slide 66), the latch keeper arm 75, being disposed in engagement with the stop 136 (as in dotted lines, Fig. 11) will cause the clutch 131, which is embodied in the boom-operating shaft 53 (Fig. 10) to slip while the mechanism 54—55—56, etc., which operates the boom-operating shaft 53, (Figs. 3 and 10) is completing its operative stroke, that is, during that part of its stroke which tends to move the boom 34 from full to dotted line position, Fig. 8; and the operating mechanism 54—55—56 for the boom-operating shaft 53 completes its operative stroke and commences to move the boom 34 back into its initial position whereupon the clutch 131 will again become effective, and the latch keeper arm 75 will return to its initial position (as in full lines, Fig. 11), while at the same time the boom 34 will return to its initial position, as in full lines, Fig. 8.

*Modified form of article-ejecting boom arm shown in Figure 21*

A modified form of the article-dispensing or ejecting arm of the boom is shown in Fig. 21, and comprises a depending extension 145 which may be attached to the boom arm, indicated at 144, for movement axially therealong, in the manner in which the boom arm 35 is attached to the boom 34.

Attached to the extension 145 is a depending lug 146 upon which is mounted one end portion of a resilient member having the form of a relatively stiff coil spring 147; and attached to the lower end portion of this coil spring 147 is an article engaging member 148.

The modified form of boom arm shown in Fig. 21 is so constructed that when the same is moved over the turntable 28, during the article-ejecting operation, the flexibility of the boom arm 147 etc., increases the hazard of ejecting an article 68 off from the turntable 28 into the article dispensing outlet 127 of the display compartment 22, since the flexible element or spring 147 of the ejecting arm has a tendency to yield when it engages a vendible article 68 disposed upon the turntable 28, thereby making it relatively difficult for the operator of the machine to vend an article 68 off from the turntable, into the dispensing outlet 127 of the display compartment 22.

While we have illustrated and described the preferred form of construction for carrying our invention into effect, this is capable of variation and modification, without departing from the spirit of the invention. We, therefore, do not wish to be limited to the precise details of construction set forth, but desire to avail ourselves of such variations and modifications as come within the scope of the appended claims.

Having thus described our invention what we claim as new and desire to protect by Letters Patent is:

1. In a vending machine a combination of: a cabinet including an article-storage or display compartment; an article-supporting turntable rotatably mounted in said article-storage or display compartment and having an article-dispensing opening provided therein; an article-delivery chute in said cabinet having communication with the said article-dispensing opening in said turntable and exterior of the cabinet; means including an exteriorly accessible member movably mounted in a wall of said cabinet for rotating said turntable; a boom mounted in said article-storage or display compartment for movement over and relative to said turntable and including an article-dispensing arm adapted to move a vendible article off of said turntable into said article-dispensing opening; and means for operating said boom and its article-dispensing arm from their initial position adjacent the periphery of the said turntable to the article-dispensing opening and back to their said initial position.

2. In a vending machine, the combination of: a cabinet including an article storage or display compartment; an article supporting turntable rotatably mounted in said display compartment and having an article dispensing opening provided therein; an article delivery chute in said cabinet having communication with said article dispensing opening; a boom movably mounted in said article storage or display compartment and including an article dispensing arm movable axially relative to and along said boom and relative to and over said turntable to move a vendible article from said turntable into said dispensing opening; means for operating said boom including a device for moving the latter and the said article dispensing arm carried thereby only from their initial position adjacent the periphery of the said turntable to the said article dispensing opening and back to their said initial position; and means including a manually operable control rotatably mounted in a wall of said cabinet and common to said turntable and said article dispensing arm for simultaneous movement of the said arm axially of the boom, and turntable.

3. In a vending machine, a combination of: a cabinet including a display compartment; an article supporting turntable rotatably mounted in said display compartment; a boom movably mounted in said display compartment for movement relative to and over said turntable; an article-dispensing member movably mounted upon said boom for movement relative thereto and axially therealong; and means including a manually operable control member rotatably mounted in a wall of said cabinet for simultaneously rotating said turntable and for moving said article-dispensing member axially along and relative to said boom, said control member being common to and operatively connected to both said turntable and said article dispensing member, whereby simultaneous rotation of the turntable and movement of the article-dispensing member axially of the boom may be effected.

4. In a vending machine, the combination of: a cabinet including an article storage or display compartment; an article-supporting turntable rotatably mounted in said display compartment and having an article-receiving opening therein; an article-delivery chute in the said cabinet having communication with the said article receiving opening and exterior of said cabinet; a wall extending around the marginal edge of said turntable and having a cut-out portion or opening formed therein; a boom movably mounted in said display compartment for movement relative to and over said turntable; an article dispensing member movably mounted upon, and depending from, said boom for movement axially therealong and relative thereto and adapted to be moved through said second-named opening; and common manually operable means for operating said turntable and said article-dispensing member axially of the boom.

5. In a vending machine, the combination of: a cabinet including an article storage or display compartment; an article-supporting turntable rotatably mounted in the said display compartment and having an article-receiving opening therein; an article delivery chute in the said cabinet having communication with said article receiving opening and exterior of said cabinet; a wall extending around the marginal edge of said turntable and having a cut-out portion or opening formed therein; a boom movably mounted in the said display compartment for movement relative to and over said turntable; an article-ejecting member movably mounted upon, and depending from, said boom for movement axially therealong and relative thereto and adapted to be moved through said second-named opening; and common manually operable means including a member movably mounted in a wall of said cabinet for operating said turntable and said article-ejecting member axially of the boom.

6. In a vending machine, the combination of: a cabinet including an article storage or display compartment; an article supporting turntable rotatably mounted in the said display compartment and having an opening formed therein; a member movably mounted in the said opening for movement relative to the said turntable; said member having an article-receiving opening formed therein and including a portion movable relative to and over the upper surface of said turntable; a boom movably mounted in the said display compartment for movement relative to and over said turntable; means for moving said boom; an article-ejecting member carried by, and depending from, said boom for movement relative to and over said turntable toward said article-receiving opening; and means for operating the said first-named member relative to and independently of the said article-ejecting member and independently of said turntable and boom.

7. In a vending machine, the combination of: a cabinet including an article storage or display compartment having an article-dispensing outlet; a turntable having an article-receiving opening communicable with said outlet and rotatably mounted in the said cabinet and adapted to support vendible articles in the said article storage or display compartment; a boom movably mounted in the said cabinet and including an article-engaging arm movable axially of the boom for positioning relative to said turntable so as to eject vendible articles off from the latter into the said article-receiving opening upon operation of said boom; means for moving the boom; and means including a manually operable control device common to the said turntable and the said article-engaging arm of said boom for simultaneously operating the same to selected relative position whereby an article on said turntable may be ejected therefrom when said boom is moved.

8. In a vending machine, the combination of: a cabinet provided with an article-dispensing outlet and including an article storage or display compartment; an article-supporting turntable rotatably mounted in said display compartment and having an article-receiving opening provided therein; an article delivery chute in the said cabinet having communication with the said article-receiving opening in said turntable and having communication with the said article dispensing outlet; a boom movably mounted in the said article storage or display compartment and including an article-dispensing arm movable axially along and relative to said boom and relative to and over said turntable and adapted to move a vendible article off from said turntable into said article-receiving opening; means for moving the said boom; means including a manually operable member movably mounted in a wall of said cabinet for simultaneously rotating the said turntable and for moving said article-dispensing arm axially along and relative to said boom; and means for latching the said turntable against rotation after the said boom has been moved a predetermined distance during its article-dispensing movement.

9. In a vending machine, the combination of: a cabinet including an article storage or display compartment; an article-supporting turntable rotatably mounted in said display compartment and having an article-receiving opening provided therein; an article delivery chute in the said cabinet having communication with said article-receiving opening and exterior of the cabinet; a boom movably mounted in the said article-storage or display compartment of said cabinet and including an article-dispensing arm movable axially along, and relative to, said boom and relative to and over said turntable and adapted to move a vendible article off from said turntable into said article-receiving opening; means for moving said boom; means including a manually operable member movably mounted in a wall of said cabinet for simultaneously rotating the said turntable and for moving the said article-dispensing arm axially along and relative to said boom; and means for automatically latching the said turntable against rotation after the said boom has been moved a predetermined distance during its article-dispensing movement.

10. In a vending machine, the combination of: a cabinet including an article storage or display compartment; an article-supporting turntable rotatably mounted in said display compartment and having an article dispensing opening provided therein; an article delivery chute in the said cabinet having communication with the said article-dispensing opening and exterior of the cabinet; a boom movably mounted in the said article storage or display compartment and including an article-dispensing arm movable axially along and relative to said boom and relative to and over said turntable and adapted to move a vendible article off from said turntable into the said article-dispensing opening; means for moving the said boom; means including a manually operable member movably mounted in a wall of said cabinet for simultaneously rotating the said turntable and for moving said article-dispensing arm axially along and relative to said boom; means for latching the said turntable against rotation after the said boom has been moved a predetermined distance during its article-dispensing movement; and a clutch mechanism for rendering the said movably mounted member ineffective for rotating the said turntable when the same is latched against operation by said latching means.

11. In a vending machine, the combination of: a cabinet including an article storage or display compartment; an article-supporting turntable rotatably mounted in the said display compartment and having an article-dispensing opening provided therein; an article delivery chute in the said cabinet having communication with the said article-dispensing opening and exterior of the cabinet; a boom movably mounted in the said article storage or display compartment and including an article-dispensing arm movable axially along and relative to said boom and relative to and over said turntable and adapted to move a vendible article off from said turntable into said article-dispensing opening; means for moving the said boom; means including a manually operable member movably mounted in a wall of said cabinet for simultaneously rotating the said turntable and for moving the said article-dispensing arm axially along and relative to said boom; means for latching said turntable against rotation after the said boom has been moved a predetermined distance during its article-dispensing movement; and a clutch mechanism for preventing movement of the said article-dispensing arm and boom if and when a resistance greater than a predetermined resistance is offered to the movement of the said boom and the said article-dispensing arm carried thereby over said turntable during their article-dispensing movement.

12. In a vending machine, the combination of: a cabinet including an article storage or display compartment; an article-supporting turntable rotatably mounted in said display compartment and having an article dispensing opening; a boom movably mounted in the said article storage or display compartment and including an article-dispensing arm movable axially along and relative to said boom and relative to and over said turntable and adapted to move a vendible article off from said turntable into said article-dispensing opening; means for moving said boom; means including a manually operable member movably mounted in a wall of said cabinet for simultaneously rotating said turntable and for moving said article-dispensing arm axially along and relative to said boom; means for automatically latching said turntable against rotation after the said boom has been moved a predetermined distance; and a clutch mechanism for preventing movement of the said article dispensing arm and boom if and when a resistance greater than a predetermined resistance is offered to the movement of said boom and the said article-dispensing arm carried thereby over said turntable during their article-dispensing movement.

13. In a vending machine, the combination of: a cabinet including an article storage or display compartment; an article-supporting turntable rotatably mounted in said display compartment and having an article-receiving opening provided therein; an article delivery chute in the said cabinet having communication with said article-receiving opening and exterior of the cabinet; a boom movably mounted in the said article storage or display compartment of said cabinet and including an article-dispensing arm movable axially along, and relative to, said boom and relative to and over said turntable and adapted to move a vendible article off from said turntable into said article-receiving opening; means for moving said boom; means including a manually operable member movably mounted in a wall of said cabinet for simultaneously rotating the said turntable and for moving the said article-dispensing arm axially along and relative to said boom; and means for automatically latching the said turntable against rotation, and the said article-dispensing arm against movement relative to said boom, after the said boom has been moved a predetermined distance during its article-dispensing movement.

14. In a vending machine, the combination of: a cabinet including an article storage or display compartment; an article-supporting turntable rotatably mounted in the said display compartment and having an article-receiving opening therein; an article delivery chute in the said cabinet having communication with the said article-receiving opening and exterior of the cabinet; a member movably mounted in the said cabinet and having a portion movable over the upper surface of said turntable around the marginal edge of said article-receiving opening; a boom movably mounted in the said display compartment for movement relative to and over the said turntable; an article-ejecting member carried by, and depending from, said boom for movement relative to and over said turntable toward said article-receiving opening; and means for automatically moving the said first-named member independently of and relative to the said turntable after a predetermined number of operations of the said boom.

15. In a vending machine, a cabinet including a display compartment having a dispensing outlet, a member rotatably mounted in said display compartment for supporting articles thereon, a boom movably mounted in the cabinet and including an extended part adjustable axially of said boom and movable over said rotatable member for ejecting engagement with articles on said rotatable member for movement of such articles into said dispensing outlet, means for operating said boom, means for rotating said rotatably mounted member, and means operable by the rotation of said first named and rotatably mounted member for adjusting said extended part axially of said boom.

16. In a vending machine, a cabinet having an article dispensing outlet and including an article storage or display compartment, a delivery chute in the said cabinet having communication with the said article storage compartment and with the said dispensing outlet, means for selectively moving articles from the said article storage compartment into the said delivery chute, a member pivotally mounted in the said delivery chute, means normally latching the said member in position to permit the passage of articles down the said delivery chute from the said article-storage compartment to the said dispensing outlet, and means, including a pendulum mounted in the said cabinet and an electromagnetic device actuated thereby, for moving the said latching means out of latching engagement with said member so as to allow the latter to move into position to prevent the passage of articles down the said delivery chute to said dispensing outlet if and when the said cabinet is tilted from its normal or proper operating position.

CLAUDE R. KIRK.
EDWARD E. COLLISON.